Jan. 24, 1961
T. E. ANDREWS ET AL
2,969,010
AUTOMATIC ELECTRIC TOASTERS
Filed April 30, 1959
5 Sheets-Sheet 4
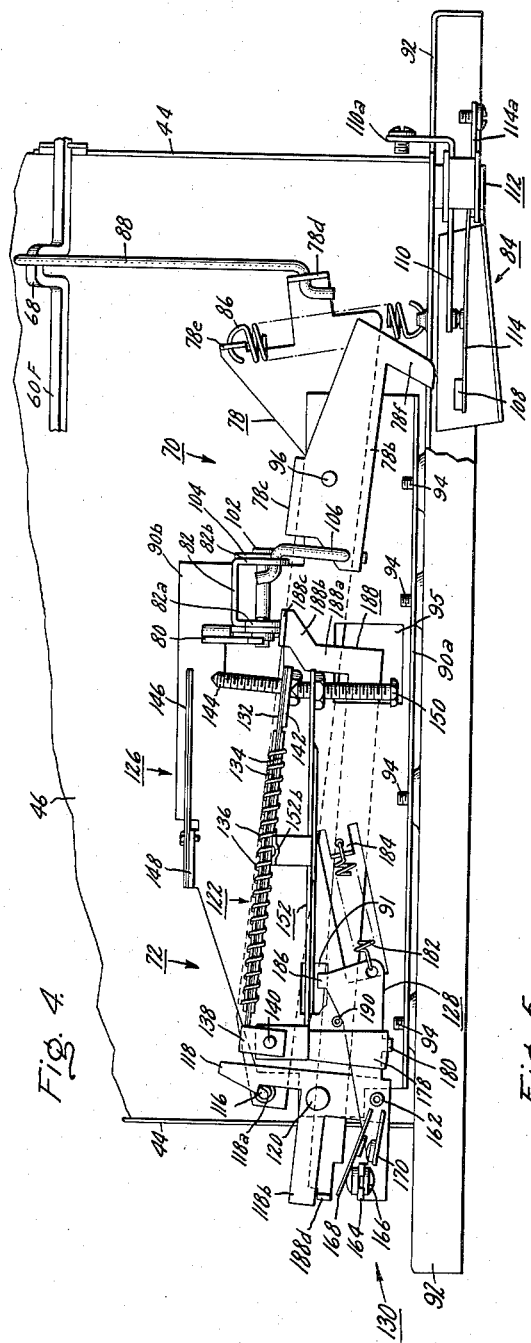
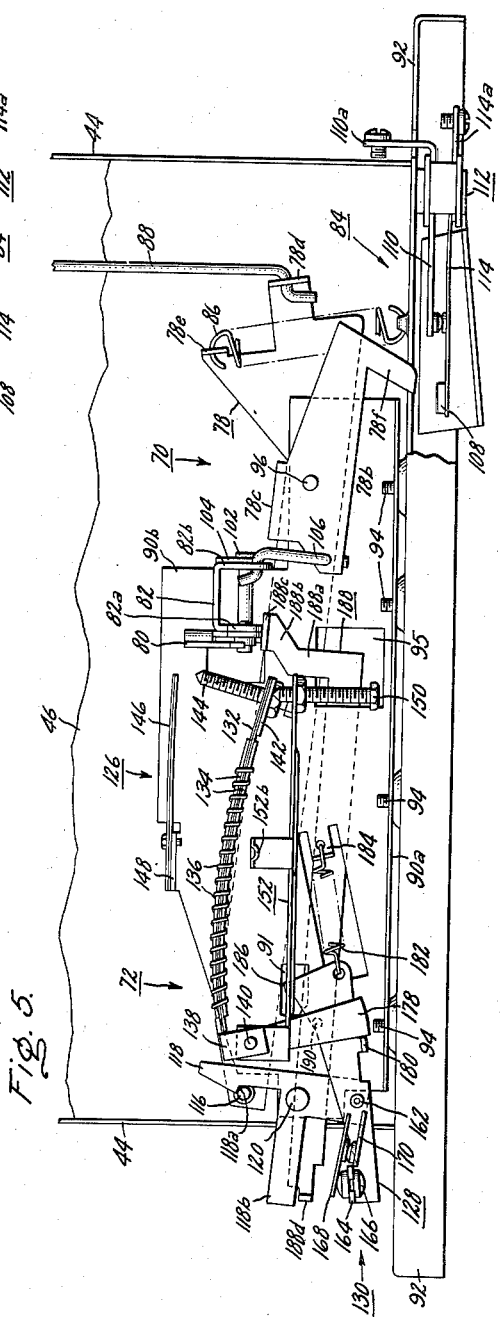
Inventors:
Theodore E. Andrews,
Alfred E. DeMott,
by Laurence R. Kempfere
Their Attorney.

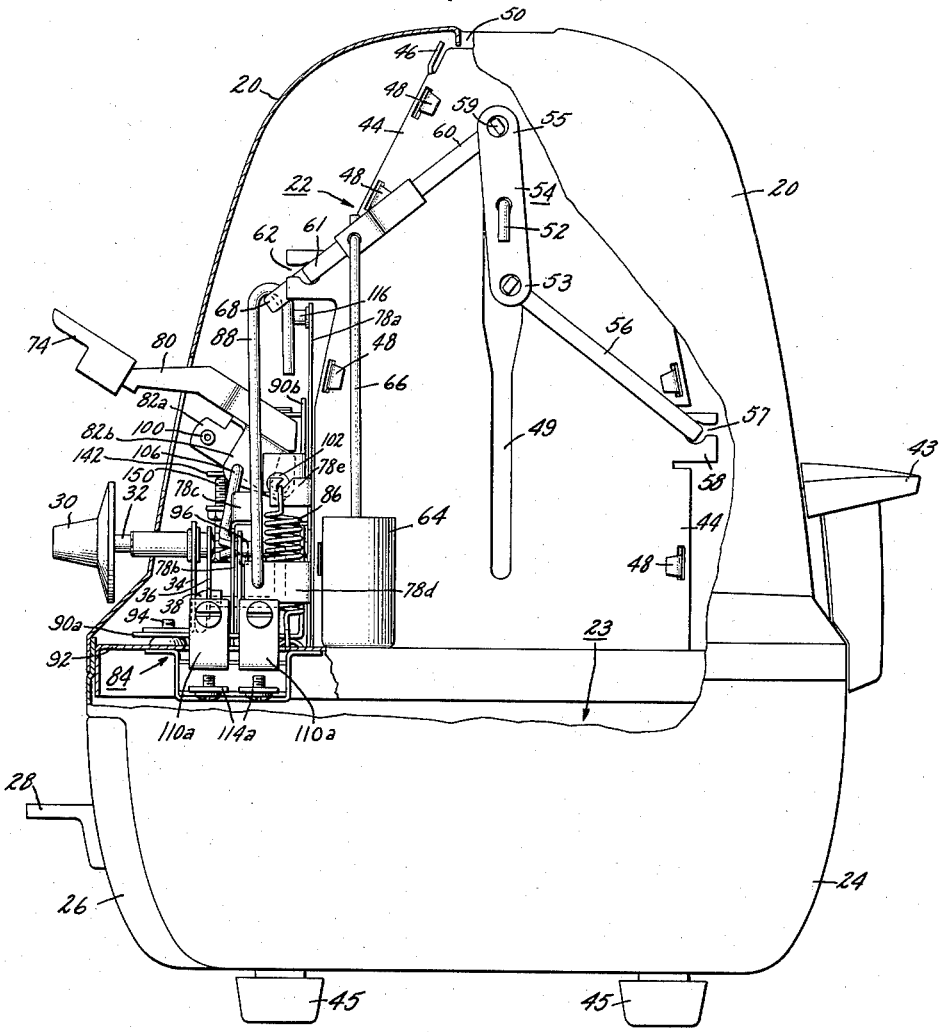

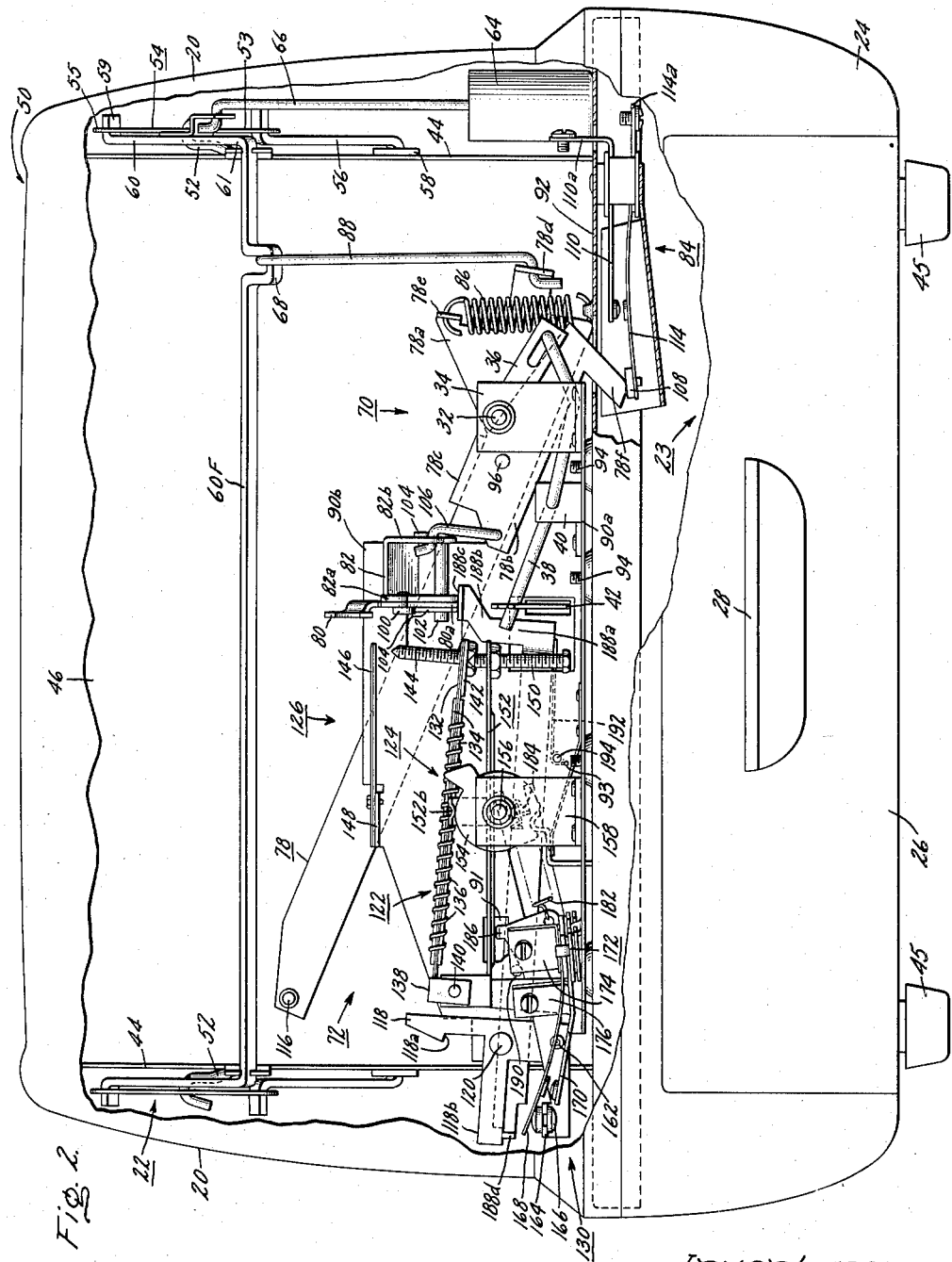

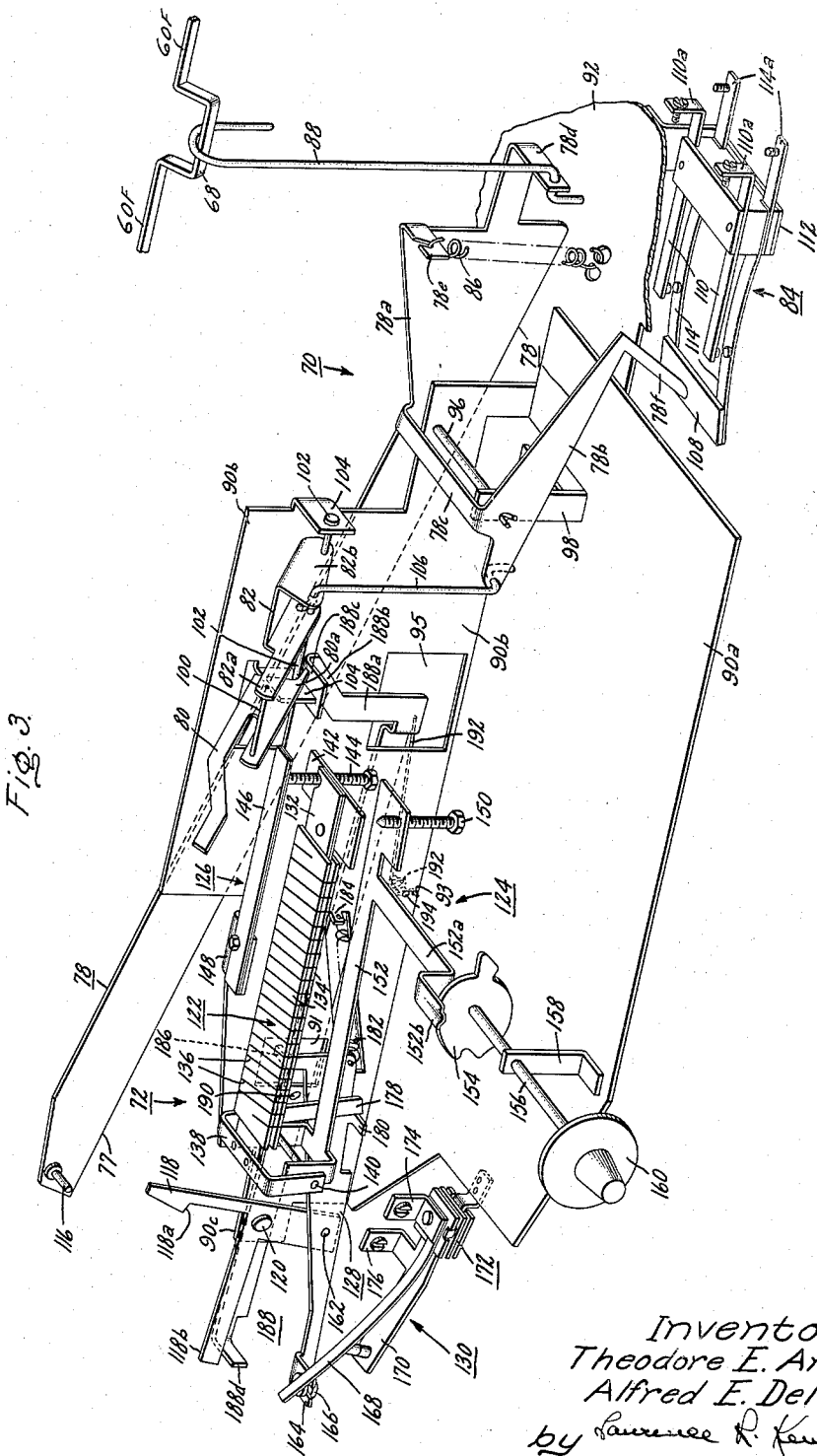

Jan. 24, 1961
T. E. ANDREWS ET AL
2,969,010
AUTOMATIC ELECTRIC TOASTERS
Filed April 30, 1959
5 Sheets-Sheet 5
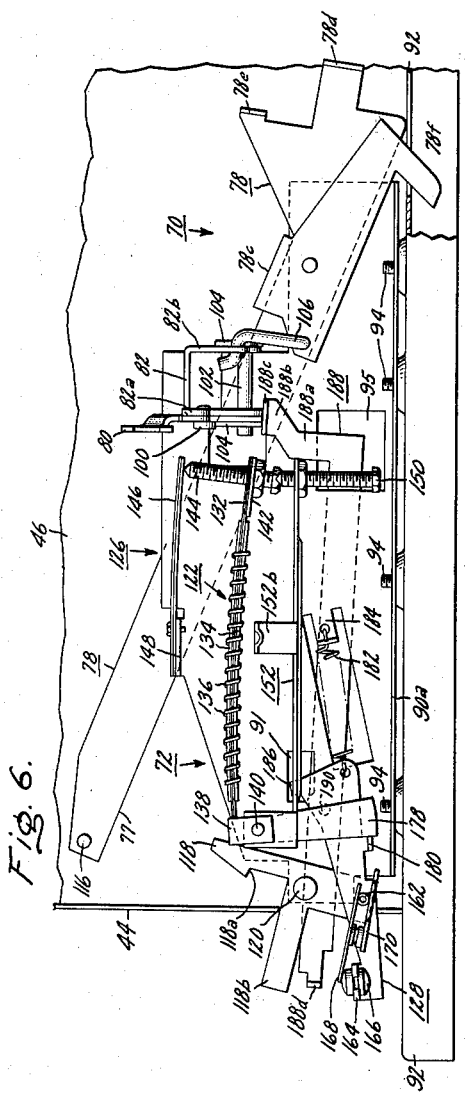
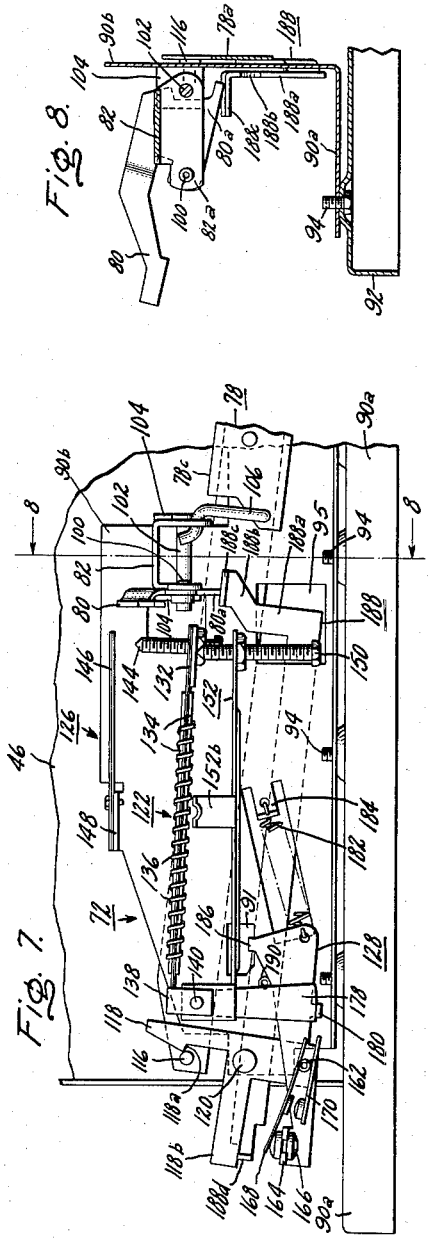
Inventors:
Theodore E. Andrews,
Alfred E. DeMott,
by Lawrence R. Kempton
Their Attorney.

United States Patent Office 2,969,010
Patented Jan. 24, 1961

2,969,010
AUTOMATIC ELECTRIC TOASTERS

Theodore E. Andrews, Orefield, and Alfred E. De Mott, South Allentown, Pa., assignors to General Electric Company, a corporation of New York Filed Apr. 30, 1959, Ser. No. 810,029

19 Claims. (Cl. 99—329)

This invention relates to improvements in automatic electric toasters. More particularly, in a preferred embodiment, it relates to an automatic electric toaster having an oven broiler compartment and a manually operated toast carriage which is moved from a non-toasting to a toasting position by the operator when initiating the toasting cycle, and in which a timer control mechanism for controlling the length of the toasting cycle is of the heat up-cool down type.

Manually actuated automatic toasters of the prior art have ordinarily been designed with an actuating lever extending substantially the length of the toaster and protruding through one end of the toaster, in order to accommodate the requisite long stroke motion of the operating lever in a plane parallel to the motion of the toast carriage. Such a construction, however, is not feasible in a toaster having a drawer type horizontal oven or broiler beneath the toasting compartment. In the latter type of toaster, to which the invention is directed, it becomes desirable to actuate the toast carriage by means of a short-stroke operating lever, and for the convenience of the user this lever or push button should preferably be operated from the broiler access side of the appliance. The motion of the operating lever should then be in a plane perpendicular to the plane of toast carriage motion. Because of the limited space and limited motion available, these objectives pose a substantial structural problem.

Reliable and accurate timing of the toasting cycle is also a more serious problem in toasters having a combined oven compartment in the base, because of the higher ambient temperatures generated thereby and the wider ambient range over which the toaster must be operable. This is true whether the oven is heated by the toasting elements or by separate heating elements due to the inherent low efficiency of the oven, when heated from above. A clock timer which is substantially independent of temperature changes might be used but, because of the high cost and delicate construction of clock-work timing control mechanisms, it is commercially desirable to employ other and simpler means for timing the toasting cycle in automatic toasters for household use. Accordingly, the appliance of the invention employs an improved timer control in which the toasting cycle is determined by the heating and cooling of a relatively inexpensive bimetallic element. Automatic toasters of the prior art which use bimetallic timer controls of the heat up-cool down type often have inherent limitations caused by interference of the various operating parts, and have not been capable of entirely satisfactory operation over the required range of ambient temperature changes. This limitation of the prior art thermal timers has been manifested when, after several operations of the toaster with the color control set on "dark," the color control is then turned to "light" and the operator attempts to initiate another toasting cycle. Often under these conditions, the high ambient temperature brought about by the repeated operation of the toaster with the color control set for dark toast, will cause the ambient temperature compensating mechanism and the timer control to interfere at the beginning of the toasting operation, and thus prevent the carriage mechanism from latching down. The same consequence may result from prolonged operation of the oven. In this situation it has heretofore been impossible to operate such toasters on the "light" setting, without awaiting a substantial time for the appliance to cool off. The improved timing control of the invention overcomes this problem.

Also the electrical switches used in the toasters of the prior art to control the electrical circuits in the toaster have normally been biased closed through mechanical forces developed in the operating mechanism of the toaster. Accordingly the contact pressures in such prior art toaster switches have varied from toaster to toaster and over the life of each individual toaster. This has heretofore resulted in a rather high incidence of arcing problems and consequent deterioration in switch contacts and switch operation. These difficulties are completely eliminated in the apparatus of the present invention.

It is therefore an object of this invention to provide a manually actuated automatic electric toaster in which the carriage actuating lever is located on the front side of the toaster, the lever motion being in a plane perpendicular to the carriage motion. Another object of the invention is to provide an automatic electric toaster of the above character in which the actuating lever travel is minimized to effect push button operation.

Another object of the invention is to provide an electric toaster which is adapted to operate with a broad range of toast color control. Yet another object of the invention is to provide an electric toaster of the above character in which the range of color control provided is relatively unaffected by the number of consecutive operations and the ambient temperature of the toaster. Still another object of the invention is to provide such an electric toaster in which the toast carriage will latch down at all ambient temperatures and color settings. A further object of the invention is to provide an electric toaster in which the toast color obtained at any setting remains constant at substantially all ambient temperatures and through successive toasting operations. Another object of the invention is to provide an electric appliance combining the features of an electric toaster of the above character with the features of an electric broiler or oven.

Yet a further object of the invention is to provide an electric toaster of the above character adapted to economical manufacture, only requiring parts fabricated to relatively wide tolerances. A still further object of the invention is to provide such an electric toaster which is adapted to convenient assembly requiring a minimum of skilled labor.

Another object of the invention is to provide an electric toaster in which the contact pressures of the various switches are substantially constant from toaster to toaster and over the life of each individual toaster. An additional object of the invention is to provide an electric toaster of the above character in which the shock hazard to the operator when the toaster is not in operation is minimized. Still another object of the invention is to provide such an electric toaster in which the shock hazard to an operator attempting to dislodge toast caught in the carriage mechanism is minimized.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

Figure 1 is an end view, partially cut away, of an electric toaster according to the present invention;

Figure 2 is a front view, partially cut away, of the electric toaster shown in Figure 1;

Figure 3 is a perspective view of the carriage actuating and timer control mechanisms of the present invention, with certain dimensions exaggerated for purposes of clarity, the various elements being shown here in their non-toasting position;

Figure 4 is a side view of the timer control mechanism of the present invention, showing the relation of parts immediately after the toasting operation has begun;

Figure 5 is another side view of the timer control mechanism, similar to Figure 4 but showing the relative positions of operating parts later in the toasting cycle, at the beginning of the period of free deflection of the bimetallic timing element;

Figure 6 is another side view of the timer control mechanism of the present invention, similar to Figures 4 and 5 but showing the relation of parts after the period of free deflection of the bimetallic element and at the completion of the unlatching period;

Figure 7 is a side view of the timer control mechanism of the invention showing the toasting interrupt mechanism in operation; and Figure 8 is a partial, sectional view taken along the lines 8—8 of Figure 7.

Fig. 9 is a circuit diagram showing the electrical heating and control circuit of the toaster shown in Fig. 1.

Similar reference characters refer to similar parts throughout the several views of the drawings.

In general, the electric toaster of the present invention has a toast rack moveable vertically from an upper non-toasting to a lower toasting position, the rack is spring biased to its upper non-toasting position and is moveable manually to its lower toasting position where it is temporarily latched down for the toasting operation. The toaster contains a bimetallic thermal element in association with an independent heating coil for timing the toaster operation. This thermal timer is of the heat up-cool down type, and includes means for automatic compensation as the ambient temperature varies.

The automatic electric toaster of the invention also has integrally associated with it a horizontal oven or broiler disposed beneath the toasting mechanism and timing control. In order to simplify the location of controls for the user's convenience, and to improve the appearance of the toaster-oven combination, the manually operated controls for actuating the toaster and oven are located along the front side of the toaster rather than on the end. The carriage operating mechanism and the thermal timer are also located along the front side of the toaster, within the appliance housing.

The thermal timer of the present invention comprises an elongated flat arm of bimetallic material pivotally supported at one of its ends. An independent electrical heating element is wound around the bimetallic arm. When the toasting operation is initiated this heating element is energized, heating the bimetallic arm which, resting loosely under the influence of gravity on a support at its free end, is caused to bow into an arc. This bowing action, after a predetermined time corresponding to a predetermined amount of bowing of the bimetallic element, is concluded by de-energizing the bimetallic arm heating element. The heating time, and thus the toast color, is controlled by raising or lowering the free end support of the bimetallic arm. Upon de-energization of its heating coil, the bimetallic arm begins to cool and straighten out to its original flat shape. The pivoted end of the bimetallic arm is restrained from rotation during this cooling period and therefore its free end rises off its support. After a predetermined period of straightening in the bimetallic arm, called the period of free deflection, the free end of the arm comes up against an upper stop, called the cool down stop. The bimetallic arm continues to cool and straighten out further against this upper stop, and the force and motion thus developed at the pivoted end of the bimetallic arm, due to its now being restrained at its opposite end, is employed to unlatch the toast carriage, thus terminating the toasting operation. The cool down stop is moved up or down by a second bimetal arm in response to changes of the ambient temperature in the toaster. This ambient temperature compensator thus varies the free deflection time of the timer bimetallic element in accordance with the toasting speed at various ambient temperatures, so that the toast color attained for a given color setting of the manual control will be constant, regardless of the instant ambient temperature in the appliance.

Since the force and motion required to unlatch the carriage are only produced as the bimetallic arm cools against the cool down stop, the carriage will always latch down at the beginning of the toasting operation, even if the free end of the bimetallic arm is in interference both with its lower support and the cool down stop. However, in order to provide a broad range of color control, and to make the toast color produced at a given color control setting independent of the number of prior toasting operations, or of prolonged operation of the oven, the period of free deflection and therefore the distance between the free end support of the bimetallic arm and the cool down stop should be maximized. To accomplish this objective in the toaster of the present invention the time, and thus the temperature change during such time, that the bimetallic arm is in contact with the cool down stop to produce the force and motion necessary for unlatching is minimized. This is done by designing the lever arms in the timer control mechanism so as to produce an overall lever ratio, between the bimetallic arm and the latch of the toaster, which will transform the force and motion produced through a given temperature change in the restrained bimetallic element into the force and motion required at the latch for unlatching the toast carriage. If this were not done, a given temperature change might produce enough force to move the latch, but not enough motion of the latch to fully release the carriage, or vice versa.

The toaster of the invention is provided with a double pole main switch which assures added safety to the user, by completely disconnecting the toaster circuit from the line when it is not in operation. All switches used in the toaster are of the normally closed type, self biased to the closed position, so that the contact pressures developed are independent of any wear or other variations in the mechanical parts of the toaster. The latch which holds the carriage down during the toasting operation is provided with a cam surface having a calculated unloading angle to partially counterbalance the latching force, further reducing the period required for unlatching. In order to more fully attain the objective of producing a toast color at a given toast setting which is independent of the number of consecutive operations, the camming surfaces of the carriage latch are of phosphate coated steel with a dry film lubricant applied thereto in order to produce a substantially constant coefficient of friction between them.

More particularly referring to Figures 1 and 2 of the drawings, the electric toaster of the present invention indicated generally at 22, is contained within an upper housing 20 which is preferably formed of sheet metal. An oven, generally indicated at 23, is located within a lower housing 24 of the appliance. An oven door 26 is provided with a handle 28, whereby the oven drawer may be withdrawn from lower housing 24. The oven heat is controlled through an oven control knob 30 mounted on a shaft 32 which is rotatably supported in a bracket 34. An arm 36 is mounted on shaft 32 and rotates a link 38 rotatably mounted in a bracket 40, as shown in Figure 2. Link 38 in turn transmits the rotation of the oven control knob 30 to an oven control lever 42. Lever 42 may open and close shutters or doors between the toaster and oven compartments of the appliance if oven heat is supplied by the toast heating elements, or it may control separate heating elements in the oven compartment. In the former case, the toast timer to be described hereinbelow will control the oven as well as the toaster operation. A handle 43 (Figure 1) may be conveniently located on the back side of the appliance housing for symmetry and ease of handling. The complete toaster-oven appliance stands on foot extensions 45.

The toast rack and toast heating elements of the toaster 22 may be of conventional construction (not shown) and are centrally disposed within the upper housing 20. The toast rack and toast heating elements are positioned within an internal enclosure formed of end plates 44—44 and side plates 46—46 only one of which is shown. The side plates 46—46 are mounted to the end plates 44—44 by means of tabs 48 (Figure 1). The toast enters the toaster through toast slot 50 in the top of the upper housing 20. The toast carriage is raised and lowered by means of Watt's motion linkages located at opposite ends of the toaster as shown in Figure 2. By referring to Figure 1, this linkage at one end may be seen to to comprise a toast carriage link 52 pivotally mounted in the center of moveable link 54. The link 52 moves up and down in carriage guide slot 49. A back link 56 has one end pivotally mounted in the lower end 53 of the link 54, and the other end pivotally mounted in opening 57 of the extension 58 formed in the back edge of end plate 44. The front link 60 has its upper end 59 pivotally mounted in the upper end 55 of link 54 and its lower end 61 pivotally mounted in opening 62 formed in the front edge of end plate 44. An air dashpot 64 is located at one end of the toaster and is connected to the front link 60 through a dashpot link 66. As shown clearly in Figure 2, the front link 60 includes a horizontal bar portion 60F extending across the front side of front side palte 46, with a crank portion 68 formed therein.

Still referring to Figure 2, the carriage actuating mechanism, generally indicated at 70, is located along the right front side of the toaster, within the upper housing 20. The thermal timer control mechanism, generally indicated at 72, is located to the left in front of side plate 46, within the upper housing 20. The toasting operation is manually initiated by depressing an actuating push button 74 located approximately in the center of the front side of the toaster (Figures 1 and 2).

Referring now to Figure 3, the carriage actuating mechanism, generally indicated at 70, comprises an operating lever 78 having a back portion 78a and a front portion 78b connected by a bridge portion 78c, all pivoted on the axis of shaft 96; push button lever 80 and a push button bracket 82; a main electrical switch generally indicated at 84; a carriage biasing spring 86; and an operating lever link 88. The carriage actuating mechanism 70 is mounted on a frame support comprising a horizontal portion 90a and a vertical back portion 90b. The horizontal portion 90a of the frame is mounted to a horizontal base plate 92 of the toaster by means of screws 94 (Figure 2).

The entire operating lever 78 is pivotally mounted on pivot pin 96 which serves as a shaft about which operating lever 78 and its appendages may pivot. The shaft 96 has one end mounted in the vertical back portion 90b of the frame and the other end mounted in a tab 98 formed up from the horizontal portion 90a of the frame. An extension 78d of operating lever 78 provides a connecting portion for the attachment of operating lever link 88 between the operating lever 78 and crank 68. Tab portion 78e of the operating lever 78 provides a hook for the attachment of one end of the carriage biasing spring 86 to the operating lever 78. The other end of the spring 86 is affixed to the horizontal base plate 92. The spring 86 biases the operating lever 78 in a clockwise rotational direction (as viewed from the front in Fig. 3) thus biasing the operating lever link 88 downward and the crank 68 in a counterclockwise direction (as viewed from the end in Fig. 1). This spring 86 biases the toast carriage to its upper position through the force exerted on front link 60 (Figs. 1 and 2).

Push button 74 (Fig. 1) is affixed to push button lever 80 which is mounted for rotation around a shoulder rivet 100 (shown in exaggerated elongation in Fig. 3). The end portion 80a of the push button lever 80 is U-shaped and straddles a pivot pin 102 (best shown in Fig. 8). Pivot pin 102 is mounted between tabs 104—104 formed out of the back portion 90b of the frame. Push button bracket 82 is rotatably mounted on pivot pin 102. Shoulder rivet 100 is affixed in an extension 82a of push button bracket 82. A push button link 106 is mounted in the other extension 82b of the push button bracket 82. The opposite end of push button link 106 is attached to the front portion 78b of the operating lever 78.

Still referring to Fig. 3, projection 78f of the front portion 78b of operating lever 78 is adapted to engage a blade insulator 108 of main electrical switch 84. Fixed blades 110—110 of the switch 84 are affixed to an insulator assembly 112. Back portions 110a—110a of the fixed blades 110—110 provide one pair of terminals of the main switch 84. The blade insulator 108 is affixed to flexible blades 114—114 which are also affixed to the insulator assembly 112. The back portions 114a—114a serve as the other pair of terminals of the main switch 84. The insulator assembly 112 is affixed to the horizontal base plate 92 in any convenient manner. The flexible blades 114—114 of the switch 84 are formed such that the switch when the blade insulator 108 is not in contact with the projection 78f, will close and the flexible blades 114—114 provide the necessary contact pressure for closing the switch independently of the rest of the toaster mechanism.

At the extreme left end of the back portion 78a of the operating lever 78, as illustrated in Fig. 3, there is located a latch pin 116. This pin is adapted to engage latch surface 118a of a latch arm 118, which is rotatably mounted by a shoulder rivet 120 to a frame extension 90c of the vertical frame portion 90b. Thermal timer mechanism 72 releases the latch arm 118 from engagement with pin 116 after the toaster has been operating for a predetermined length of time.

The timer mechanism, indicated generally at 72, comprises a bimetallic heater assembly, generally indicated at 122 in Fig. 3; a toast color control mechanism, generally indicated at 124; an ambient compensator, generally indicated at 126; a bell crank 128 and a shorting switch, generally indicated at 130. The bimetallic arm 132 of the bimetallic heater assembly 122 is substantially covered by insulating strips 134—134. A heating element 136 is wrapped around the insulators 134—134 and the arm 132. One end of the bimetallic arm 132 is affixed to a U-shaped bracket 138 which is pivotally mounted on a shaft 140 which is affixed to the back portion 90b of the frame. A screw plate 142 is affixed to the other end of the bimetallic arm 132 which is free to move arcuately about shaft 140. A cool down screw 144 is adjustably mounted in screw plate 142. When the bimetal arm 132 rotates in the counterclockwise direction (as viewed from the front in Figs. 2 and 3) cool down screw 144 is adapted to engage the end portion of a second bimetal arm 146 of the ambient compensator indicated generally at 126. The bimetal arm 146 is affixed to a tab 148 formed out of the vertical portion 90b of the frame. The bimetallic arm 132 of the bimetallic heater assembly 122 has its high expansion side facing upward and when heated will bow in the upward direction. The bimetal arm 146 of the ambient compensator 126 has its high expansion side also facing upward and is therefore adapted, when heated, to bend downward toward the cool down screw 144. The bimetal arm 146 in combination with screw 144 provides a cool down stop for the bimetallic heater assembly.

A heat up stop in the form of a screw 150 is mounted in a support arm 152, which is rotatably mounted on shaft 140. Heat up screw 150 provides a support for the free end of the bimetallic arm 132 as it is heating. An extension 152a formed at right angles out of arm 152 is shaped into a cam follower 152b. The cam follower 152b rides on a cam 154 which is mounted on a shaft 156 rotatably supported by a bracket 158 affixed to the horizontal frame portion 90a. A color control knob 160 is affixed to the other end of shaft 156. Rotation of the color control knob 160 moves the heat up screw 150 arcuately about the shaft 140, to either raise or lower the heat up screw 150 with respect to bimetallic arm 132.

Again referring to Fig. 3, bell crank 128 is rotatably mounted on a shoulder rivet 162 which is affixed to the lower end of latch arm 118. The left end of the bell crank 128 is provided with a tab extension 164 to which there is affixed a ceramic button 166. The ceramic button 166 is adapted to engage with the end of a flexible blade 168 of shorting switch 130. The fixed blade 170 of shorting swtch 130 is mounted in an insulator assembly 172 which is mounted to the horizontal frame portion 90a in any convenient manner. Terminals 174 and 176 are provided for the flexible blade 168 and fixed blade 170, respectively.

Still referring to Fig. 3, one side of the U-shaped bracket 138 is extended downwardly to form an actuating arm 178 which will rotate about shaft 140 whenever the bimetallic arm 132 moves, as when the bimetallic arm bows upwardly under the influence of its heating element 136. After the toaster has been operated and has returned to its non-toasting position, a tab protrusion 180 formed on the bell crank 128 will be in interference with the edge of the actuating arm 178 as shown in Fig. 3. A latch spring 182 extending between one end of the bell crank 128, and a tab 184 formed out of the vertical back portion 90b of the frame, biases the bell crank against actuating arm 178. Spring 182 also biases the latch arm 118 in a counterclockwise direction around shoulder rivet 120. A tab 186 formed in bell crank 128 extends through opening 91 in the frame back portion 90b and is adapted to be engaged by the lower edge 77 of operating lever 78 as it rotates counterclockwise, during actuation of the toaster. Engagement of the tab 186 by the operating lever 78 rotates the bell crank 128 clockwise around shoulder rivet 162, moving tab 180 out of interference with the edge of actuating arm 178; allowing the bimetallic heater assembly 122 to rotate under its own weight around shaft 140 until screw plate 142 engages heat up screw 150. This rotation of bell crank 128 in the clockwise direction also causes shorting switch 130 to open and allows the latch arm 118 to be biased counterclockwise by latch spring 182.

Further referring to Fig. 3, an interrupt arm 188 is pivoted about a shoulder rivet 190 affixed in the vertical frame portion 90b. Interrupt arm 188 is biased in the counterclockwise direction by a spiral spring 192 which is wound around a pin 194 mounted in the vertical frame portion 90b. One end of spring 192 passes through opening 93 in the vertical frame portion 90b. The other end of spring 192 engages the right end of interrupt arm 188. The right end of interrupt arm 188 passes through opening 95 in the vertical frame portion 90b and is formed into a vertical portion 188a, a diagonal portion 188b and push button actuated portion 188c. At the extreme left end of interrupt arm 188, there is formed a latch arm actuating portion 188d for engagement with the interrupt extension 118b of the latch arm 118. Left hand tab 104 formed out of the back frame portion 90b, normally engages push button actuated portion 188c, restraining the counterclockwise rotation of interrupt arm 188.

The operation of the toaster is as follows: Referring to Fig. 3, the operator depresses push button 74 (Fig. 1) which rotates push button lever 80 around pivot pin 102. The connection of push button lever 80 through shoulder rivet 100 to the push button bracket 82 causes the push button bracket 82 also to rotate about pivot pin 102. The rotation of push button bracket 82 around pivot pin 102 causes the push button link 106 to move downward. This simultaneously causes the operating lever 78 to rotate counterclockwise about pivot pin 96. Operating lever link 88 is thus moved upwards against the restraining action of spring 86, and crank 68 formed in the horizontal bar portion 60F of front link 60 is allowed to turn clockwise. The Watt's motion linkage (Fig. 1) then allows the toast carriage to travel downward, under the influence of gravity, to its toasting position. The downward motion will be damped to some extent by dashpot 64.

As the operating lever 78 is rotated counterclockwise, projection 78f moves upwards allowing main switch 84 to close. Projection 78f just disengages blade insulator 108 when the point of interference between the blade insulator 108 and projection 78f is 45° down from a horizontal plane through pivot pin 96. The corresponding angular position of the operating lever is the one it obtains when latched down. In this manner maximum vertical movement of the flexible switch blades 114—114 occurs when the toast carriage is near its lower position. The main switch thus opens before the toast carriage has travelled 20% of the distance between its lower position and its upper position, after the toasting operation is completed. The toast heating element is therefore disconnected so that if the carriage should get stuck on its way towards its non-toasting position, the toaster will be disconnected from the line for the safety of the user.

Also, still referring to Fig. 3, as the operating lever 78 is rotated in the counterclockwise direction, the left hand lower edge 77 of the back portion 78a of the operating lever engages tab 186 of the bell crank 128, rotating bell crank 128 clockwise about shoulder rivet 162, and opening shorting switch 130. As the bell crank 128 is rotated, tab 180 moves out of interference with the left hand edge of actuating arm 178 and the bimetallic arm 132 comes to rest upon the heat up screw 150. When the operator releases the push button 74, the latch pin 116 comes to rest against latch surface 118a and the carriage is latched down in its operating position. Latch spring 182 now biases the bell crank 128 so that tab 180 is then in interference with the end of actuating arm 178, as shown in Fig. 4. The end of actuating arm 178, being in interference with tab 180 of the bell crank 128, restrains the bell crank from counterclockwise rotation, thus holding shorting switch 130 open.

Referring now to Figs. 4 and 9, the carriage latch is closed and the toaster timing mechanism has begun to operate. Main switch 84 is closed connecting both sides L1 and L2 of the line to the toast heating element and the bimetallic arm heating element 136, which are connected in series. Shorting switch 130 is connected in parallel with bimetallic arm heating element 136 and is open. Therefore at the beginning of toasting both heating elements are energized and begin to heat up. Latch pin 116 is held in engagement with latch surface 118a by latch spring 182 acting through the bell crank 128. Screw plate 142 of bimetallic arm 132 rests on heat up screw 150. Tab 180 of bell crank 128 rests against the end of actuating arm 178. The distance X between the left hand edge of the actuating arm 178 and the right hand edge of the tab 180 determines the toast color, as will be explained below. This distance may be adjusted by rotating the support arm 152 about shaft 140 by means of the color control knob 160 (Fig.

3). As the bimetallic arm 132 begins to heat up under the influence of the heater 136, arm 132 bows upward, causing the U-shaped bracket 138 to rotate counterclockwise about shaft 140, to the position illustrated in Fig. 5.

As shown in Fig. 5, actuating arm 178 has now been rotated counterclockwise until tab 180 is no longer held in interference with the end of arm 178. The spring bias of the flexible blade 168 of switch 130 then rotates the bell crank 128 counterclockwise about shoulder rivet 162 thus rotating tab 180 into interference with the left hand edge of actuating arm 178. The rotation of bell crank 128 also allows shorting switch 130 to close shorting out and thus de-energizing the heating element 136 of the bimetallic arm 132, but leaving the toast heating element energized. The bimetallic arm 132 then begins to cool and straighten. As it cools, the screw plate 142 lifts off heat up screw 150, since the actuating arm 178 is restrained from clockwise rotation by interference with the tab 180 on the bell crank 128 and the action of the latch spring 182. The screw plate end 142 of the bimetallic arm 132 thus freely deflects upwards until the cool down screw 144 comes in contact with the bimetal arm 146 of the ambient compensator 126, as illustrated in Fig. 6.

Referring now to Fig. 6, the bimetal arm 146 of the ambient compensator 126 restrains the screw plate end of the bimetallic arm 132 from further movement in the upward direction, by its engagement with screw 144. Upon further cooling and straightening of the bimetallic arm 132, force and motion are developed therein rotating the actuating arm 178 clockwise pushing the bell crank 128 to the left against the action of latch spring 182 and thus rotating the latch arm 118 clockwise. When both the force and motion necessary at the latch surface 118a to release latch pin 116 are developed by cooling of the bimetallic arm 132, the operating lever 78 is released allowing it and the toast carriage to return to the non-toasting position under the action of biasing spring 86. This motion is partially damped by dashpot 64 (Fig. 1). Main switch 84 opens as projection 78f of the operating lever 78 rotates into interference with the blade insulator 108 which rotates the flexible blades 114—114. All elements of the toaster thus return to the positions shown in Fig. 3.

Referring again to Fig. 4, rotation of the color control knob 160 (Fig. 3) raises and lowers the cam follower 152b of support arm 152. This rotates support arm 152 about shaft 140 and this adjusts the distance X between the left hand edge of actuating arm 178 and the right hand edge of tab 180. The time of heating of the bimetallic arm 132 is thus varied since a lesser or a greater amount of bowing is then required in the arm 132 to move the end of actuating arm 178 the required distance X before shorting switch 130 closes.

As the ambient temperature inside the toaster increases after repeated operations, or when the oven 23 is operated, the toast cooks to a given color in a shorter period of time. In order to compensate for this, bimetal arm 146 of ambient compensator 126, when heated, moves downward thereby reducing the free deflection period of the screw plate end of the bimetallic arm 132, terminating the toasting operation earlier than at lower ambient temperatures.

If it is desired to terminate the toasting operation manually, as for example just after initiating the toasting operation, the operator merely lifts the push button 74, as shown in Figs. 7 and 8, rotating the push button lever upwardly and clockwise about shoulder rivet 100 (Fig. 8). U-shaped end portion 80a allows this rotation about shoulder rivet 100 and engages the push button actuated portion 188c of interrupt arm 188 rotating it clockwise about shoulder rivet 190. Latch arm actuating portion 188d thus engages the interrupt extension 118b of the latch arm 118 and rotates the latch arm clockwise releasing the operating lever 78, terminating the toasting operation.

As has been previously discussed, the reliability of the toaster of the present invention has been improved by using a main switch and a shorting switch of the normally closed type which the contact pressure is built into the switch. In this way arcing and similar problems due to variations in contact pressure have been eliminated since the contact pressure of each switch is independent of wear or minor structural variations in the other parts of the toaster mechanism.

The toaster of the present invention will always latch down regardless of the ambient temperature inside the toaster since, at the beginning of the toasting operation, even if the bimetal arm 146 of the compensator 126 is in engagement with the cool down screw 144, the heat up cycle must still occur before tab 180 will be allowed by arm 178 to move upward allowing shorting switch 130 to close. Only then, as the bimetallic arm 132 begins to cool are the required unlatching force and motion developed for releasing the operating lever. Thus the compensating action of the bimetal arm 146 of the ambient compensator 126 only affects the free deflection period of the bimetallic arm 132. However, in order to provide a broad range of color control at high ambient temperatures another condition must be met.

If the bimetal arm 146 of the compensator 126 under the influence of high ambient temperatures, resultant from repeated toasting operations or simultaneous use of the oven 23 in the appliance, moves down against the cool down screw 144 when the screw plate 142 is resting on the heat up screw 150, rotation of the color control knob towards the light setting, which ordinarily raises the heat up screw 150, is ineffective since this rotation is restricted by the interference of the bimetal arm 146 with the cool down screw 144. In order to eliminate this interference at light settings, when the heat up screw 150 is at its highest position, it is desirable to maximize the free deflection period of the bimetallic arm 132. The free deflection period and therefore the free deflection gap, between interference of the screw plate 142 with the heat up screw 150 and interference of the cool down screw 144 with the bimetal arm 146, is maximized in the preferred embodiment of the invention by minimizing the time necessary for interference between the cool down screw 144 and the ambient compensator 126. This is possible because the total cool down time is the sum of the unlatching time and the free deflection time.

Consequently the temperature change required in the bimetallic arm 132 to unlatch the latch 118 must be a minimum.

Since:

(1) $$W = P_1 B_1 = P_2 B_2$$

Where $P_1$ equals the force and $B_1$ equals the motion required at the latch surface 118a to release the operating lever 78; $P_2$ equals the force and $B_2$ equals the motion required at the pivoted end of the bimetallic arm 132 to release the operating lever 78; and W is the work required to release the operating lever 78. As will be obvious to anyone skilled in the bimetal art, in order to minimize the temperature change in the bimetallic arm 132, and time required therefor, necessary to produce unlatching, the following condition must be met:

(A) $$\Delta T_B = \Delta T_P$$

Where $\Delta T_B$ equals the temperature change required to develop the necessary *motion* of the bimetallic arm 132 to release the operating lever 78, if there were no biasing force on the latch 118; and $\Delta T_P$ equals the temperature change required to develop the necessary *force* in the bimetallic arm 132 to release the operating lever 78, if there were no motion of the latch 118 required. That is, equal temperature changes should produce the *force* and the *motion* necessary for unlatching.

The total temperature change required for actual unlatching, $\Delta T_{TOT}$, will be the sum of $\Delta T_B$ and $\Delta T_P$, or:

$$\Delta T_{TOT} = \Delta T_B + \Delta T_P$$

In other words maximum efficiency of the bimetallic arm 132 is attained when one half of the total temperature change required for unlatching will produce the necessary force and the other half of the total required temperature change will produce the necessary motion.

From bimetal formulas:

(B) $$\Delta T_B = \frac{B_2 t}{C_2 L^2}$$

(C) $$\Delta T_P = \frac{P_2 L}{b_2 w t^2}$$

Where:
$t$ equals the thickness of the bimetallic arm 132;
$C_2$ equals the thermal deflection constant of the bimetallic arm 132;
$L$ equals the effective length of the bimetallic arm 132;
$b_2$ equals the Force-Temperature constant of the bimetallic arm 132; and
$w$ equals the width of the bimetallic arm 132.

Combining Equations A, B and C:

(2) $$B_2 = \frac{P_2 L C_2 L^3}{b_2 w t^3} = \frac{P_2 L^3 C_2}{b_2 w t^3}$$

Since $P_1$ and $B_1$ are determined by the particular latch configuration and latch biasing force, the work, $W$, required of the bimetallic arm 132 is determined by Equation 1 above. Since $W = P_2 B_2$, the particular force $P_2$ and the particular motion $B_2$ produced in the bimetallic arm 132 when it is most efficient may then be determined by solving Equations 1 and 2.

When $P_1$, $B_1$ and $P_2$ and $B_2$ are known, the optimum total lever ratio between the bimetallic arm 132 and the latch surface 118a is determined and the lengths of the various levers (actuating arm 178, bell crank 128 and latch arm 118, fulcrumed on their respective pivots) are chosen to provide this optimum ratio. Thus the time that the cool down screw 144 of the bimetallic arm 132 need be engaged with bimetal arm 146 of the ambient compensator 126 in order to open the latch is minimized.

Cam surface 118a is provided with an unloading angle of approximately 10° in order to counterbalance to some extent the friction in the pivots and the friction between the ceramic button 166 and flexible blade 168 of shorting switch 130. Latch arm 118 and latch pin 116 are fabricated of phosphate coated steel to which a dry film lubricant is applied in order to provide the constant coefficient of friction between the latch surface and the latch pin necessary to produce constant unlatching time.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

What we claim as new and desired to secure by Letters Patent of the United States is:

1. A household appliance comprising, in combination, a horizontally disposed broiler, vertically disposed toasting means above said broiler in said appliance, toast carriage means in proximity to said toasting means and movable vertically between a toasting and a non-toasting position, a latch for holding the toast carriage means in its toasting position, a bimetallic thermal timing element pivoted at one end, stop means adjacent the other end of said bimetallic element, means for heating said bimetallic element, means controlling the energization of said heating means, said bimetallic element being so constituted that when heated it bows into an arc between said pivot and said stop means, rotatable means attached to the pivoted end of said bimetallic element and rotatable therewith for actuating said controlling means to de-energize said heating means after rotation of said rotatable means through a given angle, means for holding said rotatable means at said angle, said stop means adapted to restrain the rotation of said other end of said bimetallic element during cooling thereof, and means for transmitting the force thereby developed in said rotatable means due to the further cooling of said bimetallic element to said latch to release said carriage whereby the toasting operation is terminated.

2. A household appliance comprising in combination, a horizontally disposed electric broiler, heat control means for said broiler operably disposed on one longitudinal side of said appliance, vertically disposed toasting means above said broiler in said appliance, said toasting means including toast carriage means moveable vertically between a toasting and a non-toasting position, a carriage operating level pivotally mounted for motion in a plane generally parallel to the plane of carriage motion, a manually actuated lever pivotally mounted for motion in a plane substantially normal to the plane of carriage motion, a linkage operatively connecting said manual lever to said operating lever, means normally biasing said toast carriage means to its non-toasting position, carriage latch means connectable with said operating lever and adapted to hold said carriage means in its toasting position when said carriage is moved thereto against the force of said biasing means, further means actuated by said carriage operating lever to control the energization of said toasting means, and cycle control means operatively connected with said carriage latch means for releasing said carriage latch means after the lapse of a preset time interval whereby said carriage means is returned to its non-toasting position by said biasing means.

3. A household appliance comprising, in combination, a horizontally disposed electric broiler, heat control means for the appliance operably disposed on one longitudinal side of said appliance, vertically disposed electric toasting means above said broiler in said appliance; toast carriage means disposed in proximity to said electric toasting means and moveable vertically between a toasting and a non-toasting position, a carriage operating lever pivotally mounted for motion in a plane generally parallel to the plane of carriage motion, a manually actuated lever pivotally mounted for motion in a plane substantially normal to the plane of carriage motion, linkage operatively connecting said manual lever to said toast carriage operating lever, means normally biasing said toast carriage to its non-toasting position, carriage latch means connectable with said operating lever and adapted to hold said carriage in its toasting position when it is moved thereto against the force of said biasing means, means operated by said carriage operating lever to control the energization of the toast heating means, a bimetallic thermal timing element pivoted at one end, stop means adjacent the other end of said bimetallic element, means for heating said bimetallic element, means controlling the energization of said heating means, said bimetallic element being so constituted that when heated it bows into an arc between said pivot and said stop means, rotatable means attached to the pivoted end of said bimetallic element and rotatable therewith for actuating said controlling means to de-energize said heating means after rotation of said rotatable means through a given angle, means for holding said rotatable means at said angle, said stop means adapted to restrain the rotation of said other end of said bimetallic element during cooling thereof, and means for transmitting the force thereby developed in said rotatable means due to the further cooling of said bimetallic element to said carriage latch means to release said operating lever whereby the toasting operation is terminated.

4. The combination defined in claim 3 in which said stop means includes a second bimetallic element moveable in response to changes in the ambient temperature inside the appliance, and means mounting said second bimetallic element in proximity to said other end of said first bimetallic element whereby said stop means restrains rotation of said other end of said first bimetallic element at variable arcuate positions thereof depending upon the ambient temperature in said appliance.

5. In an automatic electric toaster having an electric toasting element, a toast carriage moveable between a toasting and a non-toasting position, means biasing the carriage to its non-toasting position, operating means for moving the carriage from its non-toasting to its toasting position, and releasable latch means for holding the carriage in its toasting position; electric timing means for releasing said latch means to allow said toast carriage to return to its non-toasting position comprising, a bimetallic member pivotally mounted at one of its ends; a first adjustable stop adjacent the other end of said bimetallic member and engageable with one side thereof, an actuating arm mounted on the pivoted end of said bimetallic member, an electric heating element for heating said bimetallic member, said bimetallic member adapted to bow when heated, a switch for controlling said electric heating element, said actuating arm adapted to rotate with said pivoted end as said bimetallic element bows, a restraining member in interference with said actuating arm and adapted to operate said switch to de-energize said heating element when said actuating arm has rotated through a given angle and thereafter to restrain said actuating arm from rotation in the opposite direction, a second adjustable stop spaced from said first stop and adapted to restrain movement of the unpivoted end of said bimetallic member upon cooling thereof, and means connecting said restraining member to said latch means and adapted to transmit thereto the force developed in said bimetallic member upon cooling thereof against said second stop, whereby said latch means is released to terminate the toasting operation.

6. The combination of claim 5 including manually adjustable means for varying the position of said first stop with respect to said bimetallic member whereby the heat-up time of said bimetallic member may be controlled, and a second bimetallic element for varying the stop position of said second stop as a function of the ambient temperature of the toaster, whereby the cool down time of said first bimetallic member is automatically varied in accordance with changes in ambient temperature of the toaster.

7. The combination of claim 5 and means biasing said switch normally closed, said means also biasing said restraining member to interfere with said actuating arm, and further means biasing said restraining member to restrain rotation of said actuating arm in the direction opposite to the rotation produced by bowing of said bimetallic member.

8. In an automatic electric toaster having an electric toasting element, a toast carriage moveable between a toasting and a non-toasting position, means biasing the carriage to its non-toasting position, operating means for moving the carriage from its non-toasting to its toasting position, and releasable latch means for holding the carriage in its toasting position; electric timing means for releasing said latch means to allow said toast carriage to return to its non-toasting position comprising, a bimetallic member pivotally mounted at one of its ends, a first adjustable stop adjacent the other end of said bimetallic member and engageable with one side thereof, an actuating arm mounted on the pivoted end of said bimetallic member, an electric heating element for heating said bimetallic member, said bimetallic member adapted to bow when heated, a switch for controlling said electric heating element, said actuating arm adapted to rotate with said pivoted end as said bimetallic element bows, a restraining member in interference with said actuating arm and adapted to effect operation of said switch to de-energize said heating element when said actuating arm has rotated through a given angle and thereafter to restrain said actuating arm from rotation in the opposite direction, a second adjustable stop spaced from said first stop and adapted to restrain movement of the unpivoted end of said bimetallic member upon cooling thereof, and means connecting said restraining member to said latch means and adapted to transmit thereto the force developed in said bimetallic member upon cooling thereof against said second stop, said latch means being thereby released to terminate the toasting operation, whereby the dimensions of said bimetallic member, actuating arm, restraining member, connecting means, latch means, and the biasing forces applied thereto may be chosen to provide an overall lever ratio between said bimetallic member and said latch that will transform the force and motion produced in said bimetallic member by the temperature change required to release the latch into the minimum force and minimum motion required at the latch for unlatching.

9. The combination of claim 8, in which said latch means includes a latch arm having a latch surface engageable with a latch pin for releasing said carriage, and means applying a biasing force to said latch arm, the unloading angle of said latch surface and said latch pin forming a cam, the force produced by said cam substantially counterbalancing the biasing force applied to said latch arm, and the coefficient of friction between said latch surface and latch pin being substantially constant whereby the unlatching period of said latch is substantially constant for a given toaster ambient temperature and position of said first adjustable stop.

10. A thermal timer for measuring a time interval comprising, in combination, a normally flat bimetallic element pivoted at one end, stop means adjacent the other end of said bimetallic element, means for heating said bimetallic element, means controlling the energization of said heating means, said bimetallic element when heated bowing into an arc between said pivot and said stop means, rotatable means attached to the pivoted end of said bimetallic element and rotatable therewith for actuating said controlling means to de-energize said heating means after rotation of said rotatable means through a given angle, means for holding said rotatable means at said angle, said stop means adapted to restrain the rotation of said other end of said bimetallic element during cooling thereof, and means responsive to the force thereby developed in said rotatable means due to the further cooling of said bimetallic element to terminate the time interval.

11. The combination of claim 10 and manually operable means controlling said stop means to adjust the arcuate position of said other end of said bimetallic element during heating thereof.

12. In an automatic electric toaster, a toast carriage moveable between a toasting and a non-toasting position, a latch for holding the toast carriage in its toasting position, and a heat-up cool-down thermal timer for timing the toasting operation comprising, in combination, a bimetallic element pivoted at one end, stop means adjacent the other end of said bimetallic element, means for heating said bimetallic element, means controlling the energization of said heating means, said bimetallic element being so arranged that when heated it bows into an arc between said pivot and said stop means, rotatable means attached to the pivoted end of said bimetallic element and rotatable therewith for actuating said controlling means to de-energize said heating means after rotation of said rotatable means through a given angle, means for holding said rotatable means at said angle, said stop means adapted to restrain the rotation of said other end of said bimetallic element during cooling thereof, and means for transmitting the force thereby developed in said rotatable means due to the further cooling of said bimetallic element to said latch to release said carriage and to terminate the toasting operation.

13. In an automatic toaster including toast heating means and a toast carriage moveable between a toasting and a non-toasting position, a carriage positioning mechanism comprising a carriage operating lever pivotally mounted for motion in a plane generally parallel to the plane of carriage motion, a manually actuated lever pivotally mounted for motion in a plane substantially normal to the plane of carriage motion, a linkage operatively connecting said manual lever to said operating lever, means normally biasing said toast carriage to its non-toasting position, carriage latch means connectable with said operating lever and adapted to hold said carriage in its toasting position when moved thereto against the force of said biasing means, means actuated by said carriage operating lever to control the energization of the toast heating means, and cycle control means operatively connected with said carriage latch means for releasing said carriage latch means after the lapse of a preset time interval whereby said carriage is returned to its non-toasting position by said biasing means.

14. In an automatic electric toaster the combination defined in claim 13 in which said control means includes a double pole switch of the normally closed type.

15. The combination defined in claim 13 and means connecting said carriage to said operating lever including a pair of Watt's motion linkages at opposite ends of said toast carriage, providing substantially straight line motion of said carriage between its toasting and non-toasting positions.

16. In an automatic toaster having toast heating means and a toast carriage moveable between a toasting and a non-toasting position, the combination comprising a carriage operating lever pivotally mounted for motion in a plane generally parallel to the plane of carriage motion, a manually actuated lever pivotally mounted for motion in a plane substantially normal to the plane of carriage motion, a linkage operatively connecting said manual lever to said toast carriage operating lever, means normally biasing said toast carriage to its non-toasting position, carriage latch means connectable with said operating lever and adapted to hold said carriage in its toasting position when it is moved thereto against the force of said biasing means, further means actuated by said carriage operating lever to control the energization of the toast heating means, a bimetallic thermal timing element pivoted at one end, stop means adjacent the other end of said bimetallic element, means for heating said bimetallic element, further means controlling the energization of said bimetallic heating means, said bimetallic element being so constituted that when heated it bows into an arc between said pivot and said stop means, rotatable means attached to the pivoted end of said bimetallic element and rotatable therewith for actuating said controlling means to de-energize said bimetallic element heating means after rotation of said rotatable means through a given angle, means for holding said rotatable means at said angle, said stop means adapted to restrain the rotation of said other end of said bimetallic element during cooling thereof; and means for transmitting the force thereby developed in said rotatable means due to the further cooling of said bimetallic element to said carriage latch means to release said operating lever whereby the toasting operation is terminated.

17. In an automatic electric toaster having electric heating elements, a toast carriage moveable between a toasting and a non-toasting position, means normally biasing the carriage to its non-toasting position, operating means for moving the carriage from its non-toasting to its toasting position, latch means for holding the carriage in its toasting position, and electric timing means for releasing said latch means to allow said toast carriage to return to its non-toasting position, the combination comprising: a substantially flat first bimetallic arm pivotally mounted at one end for substantially arcuate motion about an axis substantially parallel to the flat surface thereof, the other end of said arm normally resting against a first adjustable stop, means for heating said bimetallic arm to cause it to bow out of its normally flat shape; a bell crank pivotally coupled to the latch means and spring loaded to normally hold the latch means closed, a bell crank actuating arm affixed to the pivoted end of said first bimetallic arm and arcuately moveable thereby upon bowing of said bimetallic arm, engaging means on said bell crank normally abutting the end of said actuating arm when said latch is initially closed and engageable with an operating portion of said actuating arm upon movement of said arm through a predetermined arc as said first bimetallic arm bows, said engaging means then adapted to restrain arcuate motion of said actuating arm in the opposite direction from that produced by bowing of said first bimetallic arm, means operable by movement of said bell crank into engagement with the operating portion of said actuating arm for interrupting said heating means whereby said first bimetallic arm is allowed to cool; a second bimetallic member moveable in response to changes in ambient temperature, means mounting one end of said second bimetallic member in proximity to the free end of said first bimetallic arm and on the opposite side thereof from said first stop, said second bimetallic member positioned to form a second stop engageable with the unmounted end of said first bimetallic arm after a predetermined period of free deflection thereof upon cooling and adapted to restrain further deflection of said first bimetallic arm, whereby the force developed in said first bimetallic arm upon cooling is applied by said actuating arm through said bell crank to the latch means to release the toast carriage.

18. In an automatic eletcric toaster having electric heating elements, a toast carriage moveable between a toasting and a non-toasting position, means normally biasing the carriage to its non-toasting position, operating means for moving the carriage from its non-toasting to its toasting position, latch means for holding the carriage in its toasting position, and electric timing means for releasing said latch means to allow said toast carriage to return to its non-toasting position, the combination comprising: a substantially flat first bimetallic arm pivotally mounted at one end for substantially arcuate motion about an axis substantially parallel to the flat surface thereof, the other end of said arm normally resting against a first adjustable stop, means for heating said bimetallic arm to cause it to bow out of its normally flat shape; a bell crank pivotally coupled to the latch means and spring loaded to normally hold the latch means closed, a bell crank actuating arm affixed to the pivoted end of said first bimetallic arm and arcuately moveable thereby upon bowing of said bimetallic arm, engaging means on said bell crank normally abutting the end of said actuating arm when said latch is initially closed and engageable with an operating portion of said actuating arm upon movement of said arm through a predetermined arc as said first bimetallic arm bows, said engaging means then adapted to restrain arcuate motion of said actuating arm in the opposite direction from that produced by bowing of said first bimetallic arm, means operable by movement of said bell crank into engagement with the operating portion of said actuating arm for interrupting said heating means whereby said first bimetallic arm is allowed to cool; a second bimetallic member moveable in response to changes in ambient temperature, means mounting one end of said second bimetallic member in proximity to the free end of said first bimetallic arm and on the opposite side thereof from said first stop, said second bimetallic member positioned to form a second stop engageable with the unmounted end of said first bimetallic arm after a predetermined period of free deflection thereof upon cooling and adapted to restrain further deflection of said first bimetallic arm, whereby the force developed in said first bimetallic arm upon cooling is applied by said actuating arm through said bell crank to the latch means to release the toast carriage, said latch means including a latch arm operable by said bell crank, said latch arm having a latch surface engageable with a latch pin for releasing said carriage whereby the dimensions of said latch surface, latch arm, bell crank, actuating arm, first bimetallic arm, and the magnitudes and directions of the biasing forces applied thereto may be chosen so that the temperature change required in said bimetallic arm to produce the movement of the latch arm for releasing the latch is equal to the temperature change required in said bimetallic arm to produce the torque in the latch arm for releasing the latch, and the time period during which said unmounted end of said bimetallic arm is in interference with said second bimetallic member to cause the latch to open is minimized.

19. The combination defined in claim 18 in which said latch surface and said latch pin are treated with a dry lubricant to produce a constant coefficient of friction therebetween.

References Cited in the file of this patent
UNITED STATES PATENTS 2,274,810    Sardeson _____ Mar. 3, 1942

UNITED STATES PATENT OFFICE
CERTIFICATE OF CORRECTION

Patent No. 2,969,010          January 24, 1961

Theodore E. Andrews et al.

It is hereby certified that error appears in the above numbered patent requiring correction and that the said Letters Patent should read as corrected below.

Column 5, line 28, strike out "to", second occurrence; line 35, for "l nk" read -- link --; same column 5, line 42, for "palte" read -- plate --; column 7, line 26, for "swtch" read -- switch --; column 11, lines 26 to 28 for that portion of formula (2) reading $$\frac{P_2LC_2L^3}{b_2wt^3} \quad \text{read} \quad \frac{P_2LC_2L^2}{b_2wt^3}$$

column 12, line 25, for "level" read -- lever --; column 16, line 40, for "eletcric" read -- electric --.

Signed and sealed this 14th day of November 1961.

(SEAL)
Attest:

ERNEST W. SWIDER          DAVID L. LADD
Attesting Officer          Commissioner of Patents